SMITH & JUDSON.
Carriage-Spring.
No. 68,578.　　　　　　　　　　　　Patented Sept 3, 1867.
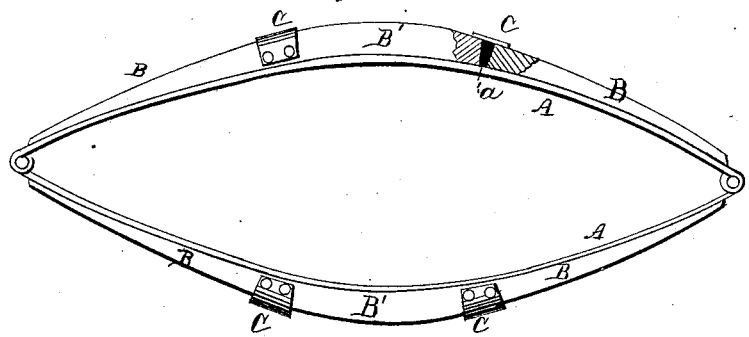
Witnesses.　　　　　　　　　　　Inventor.

United States Patent Office.

GEORGE C. SMITH AND BOSWELL S. JUDSON, OF MATTEAWAN, NEW YORK.

Letters Patent No. 68,578, dated September 3, 1867.

IMPROVEMENT IN SPRING.

The Schedule referred to in these Letters Patent and making part of the same.

TO ALL WHOM IT MAY CONCERN:

Be it known that we, GEORGE C. SMITH and BOSWELL S. JUDSON, of Matteawan, in the county of Dutchess, and in the State of New York, have invented certain new and useful improvements in Springs; and do hereby declare that the following is a full, clear, and exact description thereof, reference being had to the accompanying drawings, and to the letters of reference marked thereon.

In the annexed drawings, making part of this specification, A A represent the two parts of any ordinary elliptic spring, their ends being connected together in the usual manner by a bolt. B B' represent wooden plates, which are riveted upon the outsides of the plate-springs A A. The plates B B are tapering in thickness from one end, while the plates B' B' taper slightly in thickness from their centres, said plates when riveted to the metal springs resembling in form the usual movable plates of an ordinary elliptic spring, supposing them to be all in one piece. When the wooden plates are secured in position, there is a V-shaped recess or groove left or formed between their ends, and this recess is filled with a similar-shaped piece of India rubber, $a$. C C represent metallic keepers, which cover the joints, and the rubber being riveted to the wooden plates. These keepers prevent the rubber from leaving the recesses, and confine it so that it may be compressed when the parts of the spring are forced toward each other or when the spring is compressed.

The arrangement of the wooden plates, the rubber plugs, and the metallic plates, form a cheap and effective spring for vehicles. The form of this spring may be varied, and other than elliptic springs formed for any purpose for which such a spring may be used.

Having thus fully described our invention, what we claim as new, and desire to secure by Letters Patent, is—

The wooden plates B B', the rubber plugs C C, and the metallic springs A A, connected and used substantially as and for the purpose set forth.

In testimony that we claim the foregoing we have hereunto set our hands this 8th day of July, 1867.

GEORGE C. SMITH,
    BOSWELL S. JUDSON.

Witnesses:
  H. H. COURTENAY,
  H. H. HUSTIS.